J. F. & E. S. KING.
TAKE-UP DEVICE FOR JOINTS.
APPLICATION FILED SEPT. 29, 1914.
1,150,125.
Patented Aug. 17, 1915.
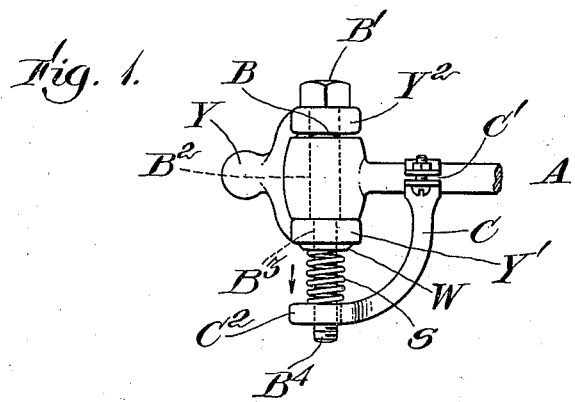
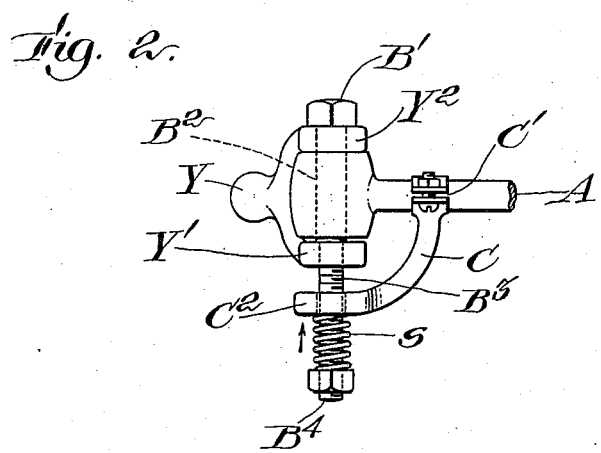
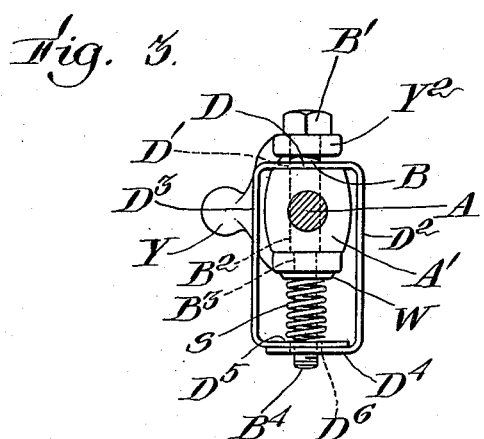

UNITED STATES PATENT OFFICE.

JOSEPH F. KING AND EDWARD S. KING, OF BROOKLINE, MASSACHUSETTS, ASSIGNORS TO MARY H. KING, OF ARLINGTON, MASSACHUSETTS.

TAKE-UP DEVICE FOR JOINTS.

1,150,125.  Specification of Letters Patent.  Patented Aug. 17, 1915.

Application filed September 29, 1914. Serial No. 864,180.

*To all whom it may concern:*

Be it known that we, JOSEPH F. KING and EDWARD S. KING, citizens of the United States, and residents of Brookline, in the county of Norfolk and State of Massachusetts, have invented new and useful Improvements in Take-Up Devices for Joints, of which the following is a specification.

Our invention consists in an improved take up for arm-and-fork pivot joints which eliminates the rattle due to the inevitable looseness of the arm member in a direction longitudinally of the pin which joins the arm and fork. This improvement is designed particularly for such arm and pivot joints as are comprised in automobile steering gear.

We are aware that it is an old contrivance to place a take up spring between two members of a pivoted joint or against a rotary member, to take up looseness in one direction and prevent rattling. But in such arm and fork joints as are employed as parts of automobile steering gear there is hardly room between the arm and fork to admit an effective spring, and spring washers, though effective for a while, soon wear down and cease to perform the take up function. Practically, it is out of the question to expect the manufacturers of automobiles or other mechanical products, to redesign the arm and fork joints comprised in their product, merely for the purpose of providing better accommodation for take-up devices or such subordinate members as arm and fork joints; and even if they were to do so, the large number of machines, etc., which have already gone into use, would still be unprovided.

This invention is susceptible of being applied to old or new machines, and thus to meet the demand without involving disproportionate expenditure.

In the drawings hereto annexed, which illustrate the invention in alternative form, Figure 1 is a view in elevation and partly in perspective, of an arm-and-fork joint, with the improved take-up. Fig. 2 is a similar view of an arm-and-fork joint, with an alternative form of take up; and Fig. 3 is another, similar view, showing still another modification of the invention.

In all the figures the arm-and-fork joint is shown as comprising the usual fork-member Y, with arms Y' and Y², the arm member A, with its head A' and pin B, which, provided with a head B', smooth cylindrical portion B², and threaded portion B³, passes through fork arm Y², head A' and is screwed into the fork arm Y' which is internally threaded for the purpose.

In the forms of take up illustrated in Figs. 1 and 2, there is provided an extensive member C, rigidly secured to the arm member A at C' and reaching therefrom to a point outside the fork member, where the extension terminates in the end C², this being perforated so as to embrace the bolt B, which is extended to B⁴, for this purpose.

In Fig. 1 the take up spring S is shown as introduced between the extension end C² and the fork arm Y', under compression, a washer W being provided as a seat for an end of the spring. The spring S, in this instance, stresses the head A' of the arm member A against the fork arm Y'. The spring S bears against the extension end C² and reacts on the fork-member Y, by thrust against the fork arm Y'.

In Fig. 2, the take up spring S is placed over the extended end B⁴ of the bolt B, outside the extension member C, and a nut is screwed to the bolt end B⁴ to provide compression of the take up spring S. In this form, the reaction of the spring S on the fork-member Y is through bolt B, which is threaded into fork arm Y', and the stress of the spring urges the head A' of the arm member A toward the fork arm Y².

In Fig. 3, the extension member is composed of a piece of strap-metal D, perforated at its middle, at D', to slip over the pin B, then bent to form side pieces D² and D³, and finally bent to form the head pieces D⁴ and D⁵, which overlap each other and are perforated to form a passage at D⁶ for the extended end B⁴ of the pin or bolt B. Spring S is placed around the extension of bolt B, under compression between fork-arm Y' and the head pieces D⁴, D⁵ of the extension piece D, stressing the arm head A' toward the fork arm Y'.

By employing an extension piece, reaching from the arm-member of the arm-and-fork joint to a point outside the fork member, means are provided for applying a take up spring which is durable, does not interfere with the normal operation of the joint, and effectively suppresses the rattle otherwise inevitable.

We claim:

1. The combination, with the arm, fork, and pin, of an arm-and-fork pivot joint, of an extension piece reaching from the arm-member to a point outside the fork-member, and a take up spring bearing on the extension piece and reacting on the fork-member, normally stressing the arm member against one of the branches of the fork member.

2. The combination, with the arm, fork, and pin, of an arm-and-fork pivot joint, of an extension piece reaching from the arm-member to a point outside the fork member and there embracing the pin of the joint, said pin being extended for the purpose, and a take up spring bearing on the extension piece and reacting on the fork-member, normally stressing the arm member against one of the branches of the fork member.

3. The combination, with the arm, fork, and pin, of an arm-and-fork pivot joint, of an extension piece rigidly secured to and reaching from the arm-member to a point outside the fork-member, and a take up spring bearing on the extension piece and reacting on the fork-member, normally stressing the arm member against one of the branches of the fork member.

4. The combination, with the arm, fork, and pin, of an arm-and-fork pivot joint, of an extension piece rigidly secured to and reaching from the arm-member to a point outside the fork-member and there embracing the pin of the joint, said pin being extended for the purpose, and a take up spring bearing on the extension piece and reacting on the fork-member, normally stressing the arm member against one of the branches of the fork member.

Signed by us at Boston, Massachusetts, this twenty-eighth day of September, 1914.

JOSEPH F. KING.
EDWARD S. KING.

Witnesses:
CHARLES D. WOODBERRY,
RICHARD W. HALL.

Copies of this patent may be obtained for five cents each, by addressing the "Commissioner of Patents, Washington, D. C."